United States Patent [19]

Sugawara et al.

[11] Patent Number: 5,063,103

[45] Date of Patent: Nov. 5, 1991

[54] REINFORCED POLYMERIC MATRIX

[75] Inventors: Tomoo Sugawara, Kawasaki; Motoyuki Yamato, Naka, both of Japan

[73] Assignee: Nippon Zeon Co., Ltd., Tokyo, Japan

[21] Appl. No.: 367,580

[22] Filed: Jun. 19, 1989

[30] Foreign Application Priority Data

Jun. 21, 1988 [JP] Japan ................................ 63-151118

[51] Int. Cl.$^5$ ............................................ B32B 27/00
[52] U.S. Cl. ................................... 428/285; 428/383; 523/207; 523/217; 524/494; 526/281; 521/82
[58] Field of Search ............... 523/207, 217; 428/285, 428/383; 524/494; 526/281; 521/82

[56] References Cited

U.S. PATENT DOCUMENTS 4,708,969 11/1987 Leach ..................................... 521/82

*Primary Examiner*—Paul R. Michl
*Assistant Examiner*—Yong S. Lee
*Attorney, Agent, or Firm*—George A. Kap; Thoburn T. Dunlap

[57] ABSTRACT

A reinforced polymeric matrix comprising a glass mat and a norbornene polymer surrounding the glass mat, the glass mat is composed of at least one glass fiber treated with a silane coupling agent and a binder adhering the glass fiber(s) to the norbornene polymer; the binder is selected from polyolefins, vinyl aromatic polymers, and ring-opened polymers of at least one norbornene-type monomer containing at least one norbornene group. Process for making a reinforced polymeric matrix comprises positioning a glass mat within a mold, the glass mat having been treated with a hydrocarbon polymer binder; mixing a plurality of streams, one stream containing a catalyst of a metathesis catalyst system, another stream containing a cocatalyst of a metathesis system, and at least one of the streams containing at least one norbornene-type monomer which is liquid at room temperature to form a mixed stream; introducing the mixed stream into the mold around the mat; polymerizing by ring opening the monomer(s) in the mold; and extracting from the mold the reinforced polymeric matrix, wherein the norbornene polymer is thermoset.

20 Claims, No Drawings

REINFORCED POLYMERIC MATRIX

BACKGROUND OF INVENTION

It is well known that ring opening polymerization can be performed on dicyclopentadiene (DCPD), methyl tetracyclododecene, and other norbornene monomers.

For example, Japanese Kokai Patent No. SHO 58[1983]-129013 discloses the manufacturing method of a thermosetting DCPD homopolymer with the aid of a metathesis catalyst using the reaction injection molding (RIM) method. In addition, Japanese Kokai Patent No. SHO 59[1984]-51911 discloses the RIM method of DCPD, methyl tetracyclododecene, and other norbornene monomers.

In these methods, although glass fibers were used to reinforce a norbornene polymer matrix, it was found that if short fibers, such as milled fibers, were used, the increase in the mechanical strength was insufficient. On the other hand, if long glass fibers were used, polymerization was easily impeded.

Hence, there are only few examples in the prior art using a glass mat for the reinforcement of a polymeric matrix. Only U.S. Pat. No. 4,708,969 discloses such a scheme. However, even in this conventional scheme, the glass mat content is only 40% by weight. In addition, the properties, such as flexural modulus, flexural strength, and the like, of the reinforced polymer with glass fibers are not sufficient.

The purpose of this invention is to provide a method of making a glass fiber reinforced norbornene polymer and a reinforced polymer matrix which has excellent mechanical strength and other properties without impeding the ring opening polymerization of the norbornene monomer.

The present inventors have performed intensive research on the method for overcoming the disadvantages of the conventional techniques. It was found that the polyester powder, commonly used as the binder of the glass mat, can seriously impede the polymerization of the norbornene monomer and as a result, the resulting polymer is insufficiently cured and has poor properties.

For the conventional glass mat using a polyester powder as the mat binder, the norbornene polymer is poorly cured and curing is also poor around the polyester powder bonded with the glass fibers. Hence, the adhesiveness between the glass mat and norbornene polymer is poor, the reinforcing effect of the glass mat is reduced, and the mechanical strength cannot be increased.

SUMMARY OF INVENTION

This invention pertains to a method for making a reinforced polymeric matrix and to a reinforced polymeric matrix itself wherein the polymer is polymerized norbornene monomer or a mixture thereof and the reinforcing material is a glass mat bonded with a hydrocarbon polymer selected from polyolefins, vinyl aromatic polymers and norbornene polymers. The norbornene monomer is selected from norbornene-type monomers which are bicyclic or have a higher cyclic structure, such as norbornene itself, dicyclopentadiene, tetracyclododecene, and tricyclopentadiene.

DETAILED DESCRIPTION OF INVENTION

The gist of this invention resides in the use of a specific type of binder to bond glass reinforcing material into a mat using long or continuous, intermediate, or short fibers. Long fibers are generally defined as those that have a longitudinal dimension of greater than 2 inches whereas short fibers have the longest dimension of ¼ to 1/32 of an inch. Anything in between is considered an intermediate fiber.

This invention, therefore, is directed to a method for making a reinforced polymeric matrix and to the reinforced polymeric matrix itself which is the product of the noted method. The polymeric matrix is a polymer of one or more norbornene-type monomers which have one or more norbornene groups therein and the reinforcing material is a glass mat of individual glass fibers or strands bound into a mat with a hydrocarbon polymer selected from polyolefins and vinyl aromatic polymers.

The polymeric matrix is prepared in a conventional way. In a preferred embodiment, at least two liquid monomer streams are prepared: one containing the metathesis catalyst dissolved in at least one norbornene monomer and the other, a metathesis cocatalyst or activator dissolved in at least one norbornene monomer. Each of these streams can contain other additives as needed. For instance, an elastomer is normally added to both streams to increase viscosity of each and to impart other advantages, an antioxidant is normally added to the stream containing the catalyst, and a halogen source is normally added to the stream containing the cocatalyst. The streams are then mixed in a mixer at about 1:1 volume ratio and then conveyed into a mold wherein a glass reinforcing mat has been previously placed. The mixed streams flow into the mold filling all voids in the mold and in the mat. The mold is normally maintained at an elevated temperature to initiate polymerization by ring opening of the norbornene monomer(s). Polymerization in the mold is completed and a reinforced, thermoset polymeric matrix is extracted from the mold.

In this invention, the monomers used as the starting materials of the norbornene polymers are those having at least one norbornene ring. Polycyclic norbornene monomers with three or more rings are preferred. Using polycyclic norbornene monomers having three or more rings, polymers with high thermal deformation temperatures can be obtained.

In addition, according to this invention, it is preferred that the resulting polymers be of the thermosetting type. Hence, it is preferred that crosslinking monomers be used.

Examples of norbornene monomers include 2-norbornene, 5-methyl-2-norbornene, 5-ethylidene-2-norbornene, vinyl norbornene, and other bicyclic compounds; dicyclopentadiene, dihydrodicyclopentadiene, and other tricyclic compounds; tetracyclododecene and other tetracyclic compounds; tricyclopentadiene and other pentacyclic compounds; tetracyclopentadiene and other heptacyclic compounds; their lower alkyl substituted compounds wherein the alkyl group can be methyl, ethyl, propyl, and butyl; their alkylidene substituted compounds such as ethylidene-substituted compounds; and the like.

Among these compounds, the tricyclic and pentacyclic species are preferred from the viewpoint of easy availability, reactivity, heat resistance, and cost.

The crosslinking monomers herein refer to polycyclic norbornene monomers having two or more reactive double bonds such as dicyclicopentadiene, tricyclopentadiene, tetracyclopentadiene, and the like. When the norbornene monomer and the crosslinking monomer are the same substance, there is no need to use a different crosslinking monomer.

The norbornene monomers having three or more rings can be obtained by the heat treatment of dicyclopentadiene compounds. As an example, one set of heat treatment conditions are as follows: the dicyclopentadiene compound is heated in an inert gas atmosphere at 120–250° C. for 0.5–20 hours. In this heat treatment, the monomer mixture containing tricyclopentadiene and unreacted dicyclopentadiene is obtained.

These norbornene monomers can be used either alone or as a mixture of two or more thereof.

In addition, as long as the purpose of this invention is not hampered, monocyclic cycloolefins, such as cyclobutene, cyclopentene, cyclopentadiene, cyclooctene, cyclododecene, etc., can be used together with one or several species of the aforementioned norbornene monomers in amount of up to 20%, preferably 1 to 10%, based on the weight of all monomers.

Any well-known metathesis catalyst can be used as the catalyst for the ring-opening polymerization of the norbornene monomer. Examples of such catalysts are disclosed in Japanese Kokai Patents Nos. SHO 58[1983]-127728, SHO 58[1983]-129013, SHO 59[1984]-51911, SHO 60[1985]-79035, SHO 60[1985]-186411, SHO 61[1986]-126115, etc. There are no special restrictions for these substances.

Specific examples of the metathesis catalyst include halides, oxyhalides, oxides, and organic ammonium salts of tungsten, molybdenum, and tantalym. Specific examples of the activating agent or cocatalyst include alkylaluminum halides, alkoxyalkylaluminum halides, aryloxyalkylaluminum halides, and organic tin compounds. A particularly useful metathesis catalyst system includes a catalyst selected from organoammonium molybdates and tungstates and a cocatalyst selected from alkylaluminums, alkylaluminum halides, alkoxyalkylaluminum halides and phenoxyalkylaluminum halides containing 1 to 18, preferably 2 to 4 carbon atoms in each alkyl group and ½ to 2½ alkoxy or phenoxy groups in the cocatalysts which contain such group(s).

With an alkylaluminum halide, polymerization starts immediately as the solution containing the catalyst is mixed. This is a problem. In such a case, the start of the polymerization can be delayed by using an activating agent such as an ether, an ester, a ketone, a nitrile, and an alcohol. For examples of such moderators, see Japanese Kokai Patent Nos. SHO 58[1983]-129013 and SHO 61[1986]-120814. In order to ensure uniform impregnation into the glass mat, a catalyst-cocatalyst with a longer pot life at 30° C. is preferred. From this point of view, a pot life longer than 5 minutes, preferably longer than 10 minutes, is needed.

Chloroform, carbon tetrachloride, and hexachlorocyclopentadiene can be added to the catalyst and the activating agent, as well as a halogenated hydrocarbon, as disclosed in Japanese Kokai Patent No. SHO 60[1985]-79035. Silicon tetrachloride, germanium tetrachloride, lead tetrachloride, and other halogenated metals can also be added. Such halogenated metals or halogenated sources are generally selected from chlorosilanes such as bicycloheptenyl methyldichlorosilane, dimethyldichlorosilane, diphenylmonochlorosilane, diphenyldichlorosilane, tetrachlorosilane, which is already mentioned, and the like.

For 1 mole of the monomer, the amount of metathesis catalyst is usually about 0.01–50 millimoles, preferably 0.1–10 millimoles. The amount of activating agent or cocatalyst with respect to the catalyst component is usually 0.1–200 on a molar ratio, preferably 2–10. The halogen source can vary in the range of 0.05 to 10 millimoles, preferably 0.1 to 2 millimoles per mol of the monomer(s).

For both the metathesis catalyst and activating agent, it is preferred that they be dissolved in the monomer. However, as long as the properties of the product are not significantly degraded, they may also be suspended or dissolved in a small amount of a solvent.

According to this invention, a glass mat is used as the reinforcing material. The glass mat is made of glass fibers matted using a mat binder made of a hydrocarbon polymer.

A sufficient reinforcing effect cannot be obtained using glass powder or milled fibers made by cutting or grinding the glass strands.

The species of the glass mat used in this invention include the chopped-strand mat prepared by cutting glass fibers into chopped strands down to 1/32 of an inch followed by matting using a binder or a continuous mat prepared by matting continuous fibers using a binder.

The glass mat can be manufactured using the conventional procedure. For example, chopped strands and a mat binder powder can be mixed, then heat pressed.

The glass mat is then appropriately shaped or cut according to the shape of the mold. In molding, the glass mat is preset in the mold, followed by injection of the reaction solution. Since the viscosity of the reaction liquid is low, a high content of the glass mat can be incorporated and a thermosetting reinforced polymer can still be obtained.

The amount of the glass mat can be appropriately selected according to the desired properties over a wide range varying from a small percentage to high percentage. In order to reinforce the polymer, the amount of the glass mat can be up to 75%, preferably 20–70% by weight with respect to the total weight of the polymer and the glass mat. According to this invention, even when the weight of the glass mat is as high as 70% by weight, a reinforced polymeric matrix with improved properties can still be obtained without inducing hazards to the polymerization.

As far as the glass mat used in this invention is concerned, the glass fibers having a silane coupling agent thereon are preferred. Among the preferred coupling agents, the species processed by an amino-group containing silane coupling agent give particularly good results.

As far as the silane coupling agents are concerned, N-β-(N-vinylbenzylaminoethyl)-γ-aminopropyltrimethoxysilane, its salt, and other such silane coupling agents containing an amino group and ethylene double bonds in their molecules, are preferred. The coupling agent is applied to the glass fibers which form the mat before the hydrocarbon polymer binder is applied to bond the glass fibers into a mat. The amount of the silane coupling agents containing amino groups if utilized is 0.01–3% by weight, preferably 0.05–1% by weight, based on the weight of the glass fibers.

According to this invention, it is necessary to use a hydrocarbon polymer as the binder for bonding the glass fibers to form a mat.

The species of hydrocarbon polymers that can be used for this purpose include polyolefins, vinyl aromatic polymers having vinyl aromatic compounds as their main components and polymers of at least one norbornene monomer. Specific examples of such hydrocarbon polymers include polystyrene, poly α-methylstyrene, polyvinyltoluene, polyethylene, polypropylene, ethylene-propylene copolymer, methyl tetracyclododecene polymer, dicyclopentadiene polymer, norbornene polymer, and other norbornene ring-opened polymers as well as their hydrogenated compounds, ethylene-norbornene copolymer, propylene-norbornene copolymer, ethylene-DCPD copolymer, propylene-DCPD copolymer, and other addition-type copolymers made of olefin and norbornene monomers, dicyclopentadiene-styrene copolymer, dicyclopentadiene-butadiene copolymer, dicyclopentadiene-conjugated diene copolymer, and other thermally polymerized hydrocarbon resins. The binder can be same as or similar to the polymer in the matrix.

Among these hydrocarbon polymers, the vinyl aromatic polymers and polyolefin colymers especially in the form of polyolefin resins are preferred. In particular, in consideration of the handling ease of the glass mat and the properties of the obtained glass-fiber-reinforced norbornene polymer, the vinyl aromatic polymers are especially preferred.

The hydrocarbon polymers can be used in various forms of the mat binder such as a powder, film, mesh, and the like. In consideration of the handling ease, the powder form is preferred. The powder can be prepared either by grinding the pellets using another solid polymer or by suspension polymerization using polystyrene.

The Vicat softening point of the hydrocarbon polymer binder is usually 30–150° C., preferably 40–140° C. As long as the shape does not collapse when the mat is dried, this softening point should be as low as possible. For this purple, the molecular weight of the hydrocarbon polymer should be reduced or the hydrocarbon polymer should be added with a plasticizer, such as chlorinated paraffin, aromatic hydrocarbon, and the like.

The amount of the mat binder with respect to the glass mat is 0.5–20% by weight, preferably 2–8% by weight. If the amount of the mat binder is too small, it becomes difficult to maintain the desired shape of the glass mat. On the other hand, if the amount is too large, it becomes costly and the reinforcing effect of the glass fibers is reduced.

The glass-fiber-reinforced norbornene polymer of this invention has an excellent flexural modulus, flexural strength, and other mechanical properties. When the hydrocarbon polymer is used as the mat binder to prepare the glass mat, the adhesiveness between the norbornene polymer and glass mat is improved without impeding the polymerization.

According to this invention, the properties of the glass-fiber-reinforced polymer can be modified by adding various additives, such as oxidation inhibitor, filler, pigment, colorant, elastomer, dicyclopentadiene thermal polymerized, resin, etc.

The species of oxidation inhibitors include the phenol type, phosphorous type, amine type, and various other oxidation inhibitors for plastics and rubber compounds.

The species of fillers include milled glass, carbon black, talc, calcium carbonate, mica, and other inorganic fillers.

The species of elastomers include natural rubber, polybutadiene, polyisoprene, styrene-butadiene copolymer, styrene-butadiene-styrene block copolymer, styrene-isoprene-styrene block copolymer, ethylene-propylene-diene terpolymer, ethylene-vinyl acetate copolymer, as well as their hydrides. The elastomers are used in amount of 1 to 10%, preferably 2 to 5%, based on the weight of the monomer(s). The polymeric elastomers are referred to herein as hydrocarbon elastomers and include saturated and unsaturated elastomers.

These additives may be premixed with one or both of the reaction solutions, or they may be introduced into the cavity of the mold, not premixed or dissolved in one or both of the reaction solutions.

According to this invention, the polymer prepared by the bulk ring-opening polymerization of the norbornene monomer with the aid of a metathesis catalyst is used. As long as the reaction is virtually a bulk polymerization, a small amount of inert solvent may be added.

As a preferred method of making the bulk ring-opening polymer, the norbornene monomer is divided into two parts added in the containers, respectively. A metathesis catalyst is added into one container and an activating agent is added into the other container. In this way two types of stable reaction solutions are prepared. These two species of reaction solutions are mixed and the mixture is injected into a mold where the bulk ring-opening polymerization occur.

The well-known impact or impingement mixing device used as the conventional RIM molding equipment can be used to mix the two or more of the reaction starting solutions. In this case, rhe containers of the reaction liquids are used as the sources of liquid streams. The streams are instantaneously mixed at the mixing head of the RIM machine and the mixture is then injected into the mold maintained at an elevated temperature where bulk polymerization occurs to form a thermosetting polymer.

Although the mixing device can be used, this invention is not limited to this type of mixing method. For example, if a pot life at room temperature of at least 1 hour is desired, it is possible to inject the mixture into a preheated mold several times after mixing of the reaction solutions in the mixer is completed, as disclosed in Japanese Kokai Pat. No. SHO 59[1984]–51911 and U.S. Pat. No. 4,426,502. In addition, the injection can also be made continuously.

Compared with the impact or impingement mixing device, the mixing device can be made to have a relatively small size. In addition, the operation can be carried out under a relatively low pressure. Hence, the glass mat set in the mold does not flow and the glass content in the moldings can be made uniform. These are the advantages of this approach.

In addition, this invention is not limited to the approaches using only two reaction liquids. Variations that can be easily understood by the workers in the trade can also be used. For example, a third flow stream from a third container with a monomer and the desired additives contained in it, can be added.

In consideration of the property of impregnation, it is preferred that the viscosity of the reaction liquids be made as low as possible as they are injected into the mold. Usually, the viscosity at 25° C. should be lower than 500 cps, preferably lower than 200 cps, or lower than 100 cps with even better results.

Usually, the mold temperature should be higher than 30° C, preferably 40–200° C., or especially 50–120° C. for better results. The molding pressure should be 0.1–100 kg/cm².

The polymerization time should be appropriately selected. Usually, it should be shorter than about one half hour, preferably between one quarter of an hour and 2 seconds, especially 5 minutes and 5 seconds. However, longer time is also possible.

The reaction starting liquids are usually stored and used in the operation in an inert atmosphere, such as nitrogen. However, the mold need not necessarily be sealed with an inert gas.

This invention will now be illustrated greater particularity by the examples which follow, however, it is not limited in any way thereby. The claims appended hereto define the metes and bounds of the invention disclosed herein.

EXAMPLE 1

This example demonstrates preparation of a glass mat.

The starting material of the glass mat was prepared by cutting a 200-filament strand into 1-inch-long chopped strands. Each filament had diameter of 13 μm.

The glass fibers or strands had their surfaces treated using styrylsilane (N-β-(N-vinylbenzylaminoethyl)-β-aminopropyltrimeth-oxysilane hydrochloride salt as the coupling agent and a silicone emulsion as the appreciation medium.

The glass mat was prepared as follows: a polyethylene tetrafluoride sheet was applied on a press plate; a metallic frame measuring 200 mm × 200 mm was set on the sheet. Into this frame, 18 g of the aforementioned chopped strands and 0.54 g (3% by weight) of a mat binder were scattered at random, followed by heat pressing in a nitrogen atmosphere at a pressure of 450 g/m².

Table I lists the types of mat binders, pressing conditions, and operation properties of the glass mats.

TABLE I

| Mat No. | Mat binder (powder) | Vicat Softening Point (°C.) | Pressing Conditions | Mat Operating Property |
|---|---|---|---|---|
| A | Polystyrene powder | 85 | 150° C. for 20 min. | Good(*1) |
| B | | | 100° C. for 20 min. | May collapse relatively easily(*2) |
| C | 90% of polystyrene and 10% of a plasticizer powder | 70 | 100° C. for 20 min. | Good |
| D | Polynorbornene | 35 | 190° C. for 5 min. | Good |
| E | 10% of DCPD resin | 70 | 150° C. for 20 min. | May collapse relatively easily(*3) |
| F | Polyester | 80 | 160° C. for 5 min. | Good |

TABLE I-continued

| Mat No. | Mat binder (powder) | Vicat Softening Point (°C.) | Pressing Conditions | Mat Operating Property |
|---|---|---|---|---|

(*1) It can be easily cut with scissors and can be bent.
(*2) It partially collapses when being cut with scissors.
(*3) It collapses when being bent.

EXAMPLE 2

2–7 plies of the aforementioned glass mat were applied on a flat plate mold measuring 3 mm × 200 mm × 200 mm. With the mold set on its edge, the reaction solution was then injected.

The norbornene monomer, made of 90% of dicyclopentadiene (DCPD) and 10% of a cyclopentadiene trimer (a mixture of 80% of an asymmetric trimer and 20% of a symmetric trimer), was added to two containers. In one container, solution A was prepared by adding diethyl aluminum chloride at a concentration of 40 mm with respect to the monomer, n-propyl alcohol at a concentration of 52 mm, and silicon tetrachloride at a concentration of 20 mm. The viscosity of solution A at 25° C. was about 30 cps. In another container, solution B was prepared by adding tri(tridecyl)ammonium molybdate at a concentration of 10 mmol with respect to the monomer. The viscosity of solution B was nearly the same as that of solution A.

The pot life of the mixture of solution A and solution B was 10 minutes at 30° C.

After solution A was defoamed and the atmosphere was replaced by nitrogen, solution B was added to prepare the reaction solution. The reaction solution was kept at room temperature of 25° C. The aforementioned mold with glass mats positioned therein was heated to 70° C. The aforementioned reaction solution was then injected into it by a gear pump from the bottom of the mold for 10 seconds. Afterwards, ring-opening polymerization in bulk was performed at 70° C. for 5 minutes of the mold contents.

After polymerization, a plateshaped glass-fiber reinforced polymer block was obtained. It was then cut into samples of appropriate lengths and properties were measured, with the results listed in Table II.

TABLE II

| Test No. | Glass mat No. (binder) | Glass content (%) | Flexural modulus (kg/mm²) | Flexural strength (kg/mm²) | Izod impact strength (kg · cm/cm) | Curing state of polymer |
|---|---|---|---|---|---|---|
| 1 | A | 30 | 600 | 20 | >80 | Fully cured |
| 2 | Polystyrene | 46 | 1080 | 29 | >80 | Fully cured |
| 3 | | 60 | 1220 | 32 | >80 | Fully cured |
| 4 | | 63 | 1360 | 33 | >80 | Fully cured |
| 5 | C Polystyrene | 60 | 1200 | 30 | >80 | Fully cured |
| 6 | D | 32 | 580 | 16 | >80 | Fully cured |
| 7 | Polynorbornene | 60 | 1100 | 23 | >80 | Fully cured |
| 8 | E DCPD resin | 60 | 900 | 20 | >80 | Fully cured |
| 9 | F | 31 | 530 | 11 | >80 | Poor curing around polyester powder, causing whitening, indicating poor curing. |
| 10 | Polyester | 60 | 600 | 12 | >80 | |

Based on the data herein, in the polymer matrix reinforced with a glass mat wherein a hydrocarbon polymer was used as the mat binder, the flexural modulus and flexural strength are significantly improved. In particular, the effect of the improvement is more significant with higher amounts of the glass reinforcing.

On the other hand, when the glass mat with the conventional polyester powder as the mat binder was used, polymerization was more seriously hampered and the reinforcing effect of the glass fibers became insufficient as amount of the glass was increased.

Observation of the adhesiveness between the polymer and the glass fibers indicates that when the polyester binder is used, curing is poor around the polyester polymer powder. This leads to a whitening phenomenon and a poor adhesiveness.

As far as the Izod impact strength is concerned, although all the results listed in Table II are greater than 80 kg·cm/cm, and there seems to be no difference, this is nevertheless due to the limitation in the measuring power of the tester used. It is believed that the product of this invention would have a better performance in this respect.

It thus can be concluded that the reinforced norbornene polymer matrix has greatly improved mechanical properties, such as flexural modulus and flexural strength, without impeding the ring-opening polymerization of the norbornene monomer. It is possible to make various moldings from this type of glass-fiber reinforced norbornene polymer used for a wide range of applications where strength and heat resistance are required.

We claim:

1. A reinforced polymer comprising a ring-opened nonbornene polymer and a glass fiber mat disposed therein, wherein said norbornene polymer comprises at least one norbornene-type monomer which is polymerized in the presence of said glass mat, and wherein aid mat contains a hydrocarbon binder selected from the group consisting of polyolefins, vinyl aromatic polymers, and mixtures thereof.

2. The reinforced polymer of claim 1 wherein the weight of said glass fiber mat is up to 75% by weight, based on the weight of said polymer and said glass fiber mat, and wherein the amount of said hydrocarbon polymer binder is 0.5 to 20% by weight of said glass fiber mat.

3. The reinforced polymer of claim 2 wherein the weight of said glass fiber mat is 20 to 70% and the amount of said binder is 2 to 8%.

4. The reinforced polymer of claim 2 which also includes 0.01 to 3% by weight of a silane coupling agent on said mat, based on the weight of said glass mat, said coupling agent being disposed on the glass fibers of said mat and said binder is disposed over said coupling agent.

5. The reinforced polymer of claim 2 which also includes 0.05 to 1% by weight of a silane coupling agent on said mat, based on the weight of said mat, said coupling agent being disposed on the glass fibers of said mat and said binder is applied over said coupling agent.

6. The reinforced polymer of claim 4 wherein said glass mat is formed from a single continuous glass fiber or a plurality of glass fibers at least 1/32 of an inch in length.

7. The reinforced polymer of claim 6 wherein said binder is selected from polystryene, poly α-methylstyrene, polyvinyltoluene, polyethylene, polypropylene, ethylene-propylene copolymer, and mixtures thereof.

8. The reinforced polymer of claim 7 wherein the weight of said glass fiber mat is 20 to 70% and the amount of said silane coupling agent is 0.05 to 1%.

9. The reinforced polymer of claim 7 wherein said norbornene-type monomer is selected from bicyclic monomers, tricyclic monomers, pentacyclic monomers, and mixtures thereof.

10. The reinforced polymer of claim 8 wherein said norbornene-type monomer is selected from methyl norbornene, vinyl norbornene, ethylidene norbornene, dicyclopentadiene, dihydrodicyclopentadiene, tricyclopentadiene, heat treatment products of dicyclopentadiene, and mixtures thereof.

11. A process for preparing reinforced polymer comprising placing a glass mat in a mold; mixing a plurality of streams to form a mixed stream; introducing the mixed stream into the mold which flows around the glass mat; polymerizing in the mold by ring-opening at least one norbornene-type monomer contained in at least one of the streams to form a norbornene polymer; and extracting from the mold said reinforced polymer; one stream contains a catalyst of a methathesis system; another stream contains a cocatalyst of a metathesis system; at least one of the streams contains at least one norbornene-type monomer(s) containing at least one norbornene group; and the glass mat is bonded with a hydrocarbon polymer binder selected from the group consisting of polyolefins, vinyl aromatic polymers containing vinyl aromatic compounds as their main component, and mixtures thereof.

12. The process of claim 11 wherein the mold is maintained at 40 to 200° C.; wherein said glass mat is formed from a single continuous glass fiber or a plurality of fibers at least 1/32 of an inch in length; wherein the weight of the glass mat is up to 75% by weight, based on the weight of said norbornene polymer and said glass fiber mat; and wherein the amount of the hydrocarbon polymer is 0.5 to 20% by weight of the glass mat.

13. The process of claim 12 wherein the mold is maintained at 50 to 120° C., wherein weight of the glass mat is 20 to 70%, and wherein amount of the hydrocarbon polymer is 2 to 8%.

14. The process of claim 13 including the step of applying 0.01 to 3% by weight of a silane coupling agent to the glass fiber(s), based on the weight of the glass fiber(s), the coupling agent is disposed on the glass fiber(s) and the hydrocarbon polymer is disposed over the coupling agent.

15. The process of claim 14 wherein the amount of the coupling agent is 0.05 to 1%; and wherein said hydrocarbon polymer is selected from the group consisting of polystyrene, poly α-methylstyrene, polyvinyl toluene, polyethylene, polypropylene, ethylene-propylene copolymer, and mixtures thereof.

16. The process of claim 14 wherein the catalyst of the metathesis system is selected from organoammonium molybdates, organoammonium tungstates, and mixtures thereof; wherein the cocatalyst of the metathesis catalyst system is selected from alkylaluminum compounds, alkylaluminum halide compounds, alkoxyalkylaluminum halides, aryloxyalkylaluminum halides, and mixtures thereof; wherein each alkyl group in the cocatalyst contains 1 to 18 carbon atoms; wherein the amount of the catalyst is 0.01 to 50 millimoles per mole of the norbornene-type monomer(s); and wherein molar ratio of the cocatalyst to the catalyst is 0.1 to 200.

17. The process of claim 14 wherein the catalyst is selected from organoammonium molybdates and tungstates; wherein the catalyst is selected from alkoxyalkylaluminum halides and phenoxyalkylaluminum halides containing 2 to 4 carbons in each alkyl group, there being ½ to 2½ alkoxy or phenoxy groups in the cocatalyst; wherein amount of the catalyst is 0.1 to 10 millimoles per mol of monomer(s); and wherein molar ratio of the cocatalyst to the catalyst is 2 to 10.

18. The process of claim 17 wherein the cocatalyst stream also includes a halogen source in amount of 0.05 to 10 millimoles per mole of the monomer(s).

19. The process of claim 17 wherein the cocatalyst stream also includes a halogen source in amount of 0.1 to 2 millimoles per mol of monomer(s), said halogen source is selected from chlorosilanes, and the norbornene polymer is thermostat.

20. The process of claim 19 wherein the halogen source is selected from bicycloheptenyl methylchlorosilane, dimethylmonochlorosilane, dimethyldichlorosilane, diphenylmonochlorosilane, diphenyldichlorosilane, tetrachlorosilane, and mixtures thereof; at least one of said streams containing a hydrocarbon elastomer in amount of 1 to 10% by weight, based on the weight of the monomer(s).

* * * * *